(12) United States Patent
Takahashi et al.

(10) Patent No.: US 11,108,084 B2
(45) Date of Patent: Aug. 31, 2021

(54) SULFIDE SOLID ELECTROLYTE AND BATTERY

(71) Applicant: Mitsui Mining & Smelting Co., Ltd., Tokyo (JP)

(72) Inventors: Tsukasa Takahashi, Ageo (JP); Takahiro Ito, Ageo (JP); Takashi Chikumoto, Ageo (JP); Teruaki Yagi, Ageo (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 17/045,696

(22) PCT Filed: Nov. 6, 2019

(86) PCT No.: PCT/JP2019/043449
§ 371 (c)(1),
(2) Date: Oct. 6, 2020

(87) PCT Pub. No.: WO2020/095936
PCT Pub. Date: May 14, 2020

(65) Prior Publication Data
US 2021/0028486 A1    Jan. 28, 2021

(30) Foreign Application Priority Data

Nov. 8, 2018   (JP) .............................. JP2018-210466

(51) Int. Cl.
*H01M 4/02* (2006.01)
*H01M 10/0562* (2010.01)
(Continued)

(52) U.S. Cl.
CPC ..... *H01M 10/0562* (2013.01); *C04B 35/5152* (2013.01); *C04B 35/547* (2013.01);
(Continued)

(58) Field of Classification Search
CPC ...................................................... H01M 4/02
See application file for complete search history.

(56) References Cited

U.S. PATENT DOCUMENTS 9,812,734 B2   11/2017  Miyashita et al.
9,899,701 B2    2/2018  Miyashita et al.
(Continued)

FOREIGN PATENT DOCUMENTS

CN   104185873 A   12/2014
CN   104885288 A    9/2015
(Continued)

OTHER PUBLICATIONS

Ukawa et al., "Characterization of argyrodite-type Li6PS5Cl1-xBrx solid electrolytes", Lecture abstract of 82nd conference in the Electrochemical Society of Japan, Mar. 9, 2015, two pages, English-language Abstract.
(Continued)

*Primary Examiner* — Jacob B Marks
(74) *Attorney, Agent, or Firm* — The Webb Law Firm

(57) ABSTRACT

A novel sulfide solid electrolyte containing Li, P, S, and a halogen, which can be used as a solid electrolyte for a lithium secondary battery or the like, and is able to suppress the generation of a hydrogen sulfide gas even when exposed to moisture in the atmosphere. The sulfide solid electrolyte comprises a crystal phase or a compound having an argyrodite-type structure and containing Li, P, S, and a halogen; and a compound composed of Li, Cl, and Br and having a peak at each position of $2\theta=29.1°\pm0.5°$ and $33.7°\pm0.5°$ in an X-ray diffraction pattern.

13 Claims, 2 Drawing Sheets

(51) Int. Cl.
   *C04B 35/515* (2006.01)
   *C04B 35/547* (2006.01)
   *H01M 10/0525* (2010.01)

(52) U.S. Cl.
   CPC ... *H01M 10/0525* (2013.01); *C04B 2235/444* (2013.01); *C04B 2235/446* (2013.01); *C04B 2235/76* (2013.01); *H01M 2300/008* (2013.01); *H01M 2300/0091* (2013.01)

(56) References Cited

U.S. PATENT DOCUMENTS

| | | | |
|---|---|---|---|
| 9,899,702 | B2 | 2/2018 | Miyashita et al. |
| 10,033,065 | B2 | 7/2018 | Kanno et al. |
| 10,128,532 | B2 | 11/2018 | Kato et al. |
| 10,374,253 | B2 | 8/2019 | Utsuno et al. |
| 10,483,587 | B2 | 11/2019 | Terai et al. |
| 10,644,348 | B2 | 5/2020 | Higuchi et al. |
| 2016/0156064 | A1 | 6/2016 | Miyashita et al. |
| 2016/0164136 | A1 | 6/2016 | Higuchi et al. |
| 2017/0222257 | A1 | 8/2017 | Miyashita et al. |
| 2017/0352916 | A1 | 12/2017 | Miyashita et al. |
| 2018/0170756 | A1* | 6/2018 | Sato ............... H01B 13/00 |
| 2019/0140313 | A1 | 5/2019 | Terai et al. |
| 2019/0140314 | A1 | 5/2019 | Utsuno et al. |
| 2019/0305371 | A1 | 10/2019 | Utsuno et al. |
| 2019/0312304 | A1 | 10/2019 | Uesugi et al. |

FOREIGN PATENT DOCUMENTS

| | | |
|---|---|---|
| CN | 107112586 A | 8/2017 |
| JP | 2013137889 A | 7/2013 |
| JP | 201624874 A | 2/2016 |
| JP | 201867552 A | 4/2018 |
| WO | 2015001818 A1 | 1/2015 |
| WO | 2015012042 A1 | 1/2015 |
| WO | 2016104702 A1 | 6/2016 |
| WO | 2018003333 A1 | 1/2018 |
| WO | 2018047566 A1 | 3/2018 |

OTHER PUBLICATIONS

Natarajan et al.,"A Study On the Composition of a Binary Mixed Crystal", Journal of Crystal Growth, 1986, pp. 1001-1004, vol. 79.

Ramondo et al., "Model Calculations for Mixed Alkali Metal Halide Microclusters", Journal of Molecular Structure, 1989, pp. 203-210, vol. 193.

* cited by examiner

[FIG 1]
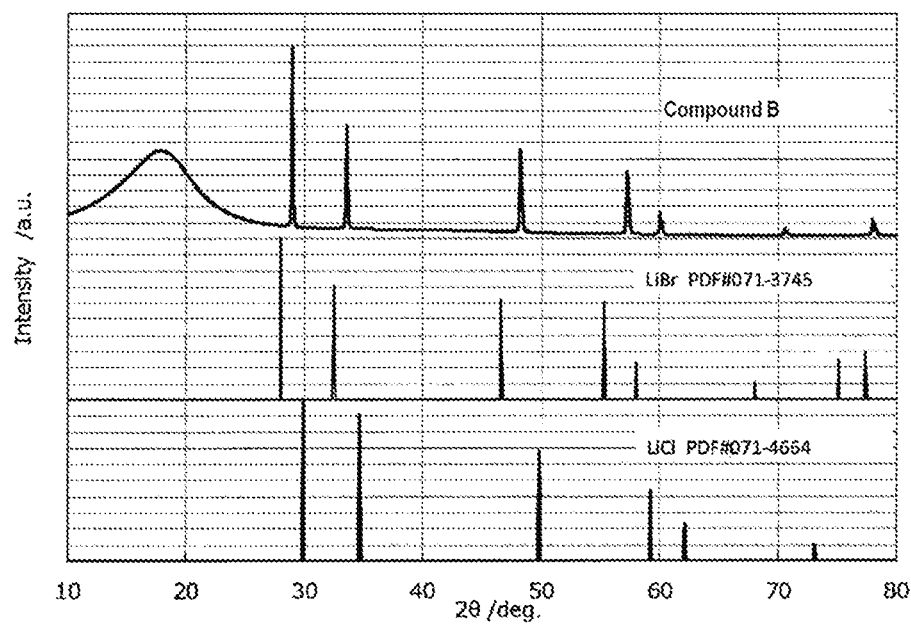
[FIG 2]
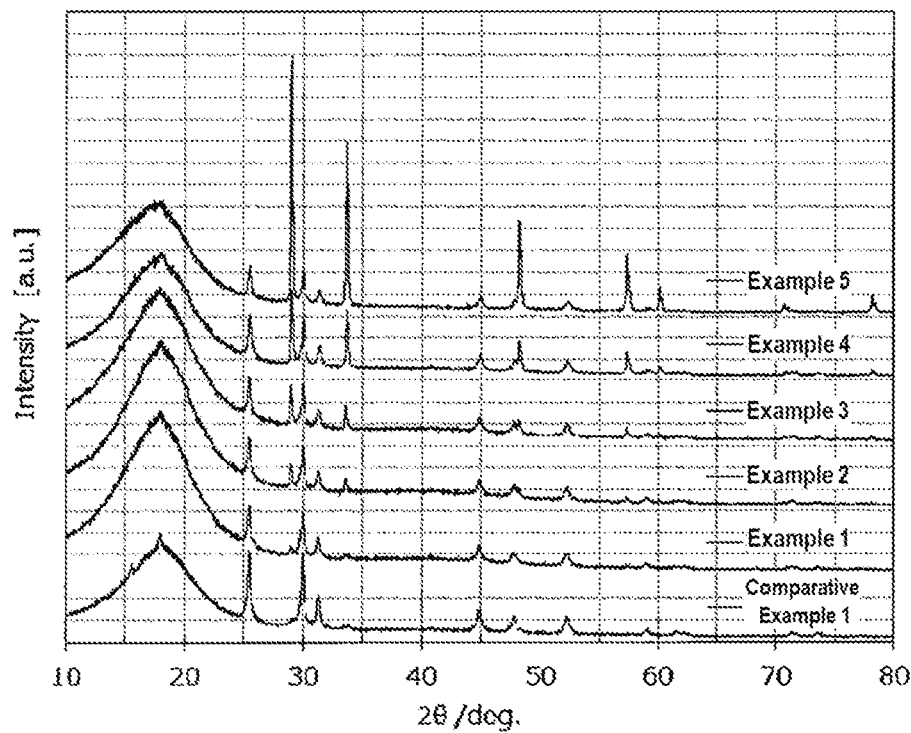

[FIG. 3]
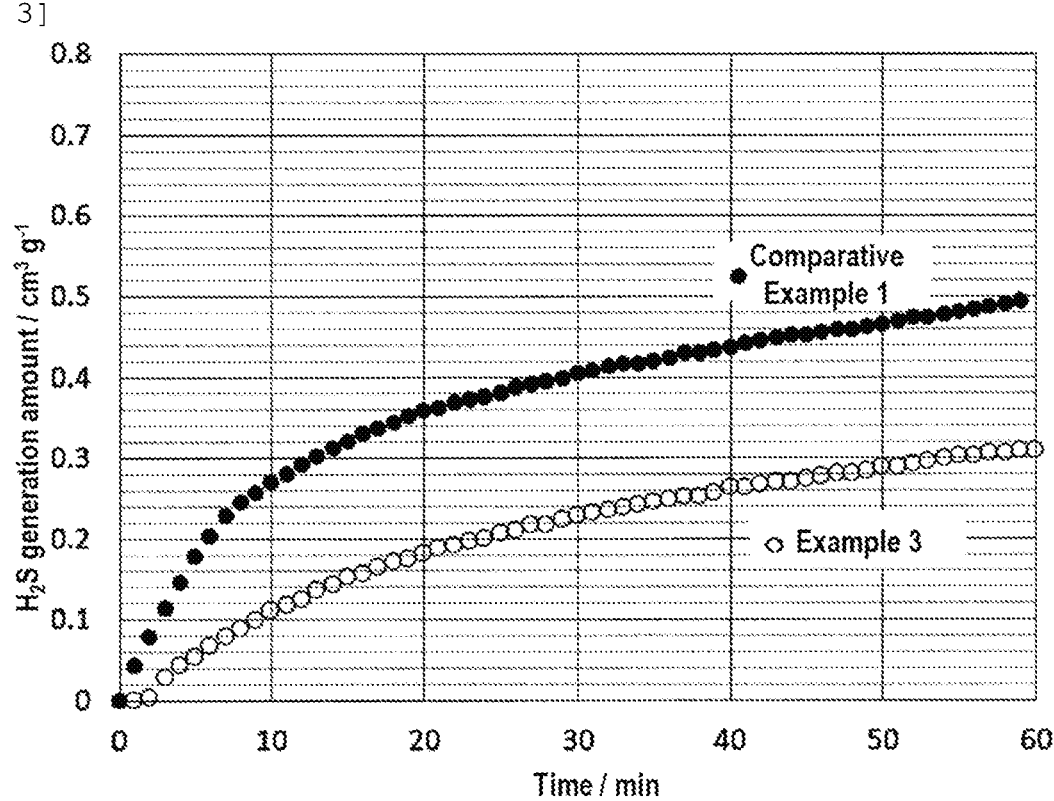
[FIG. 4]
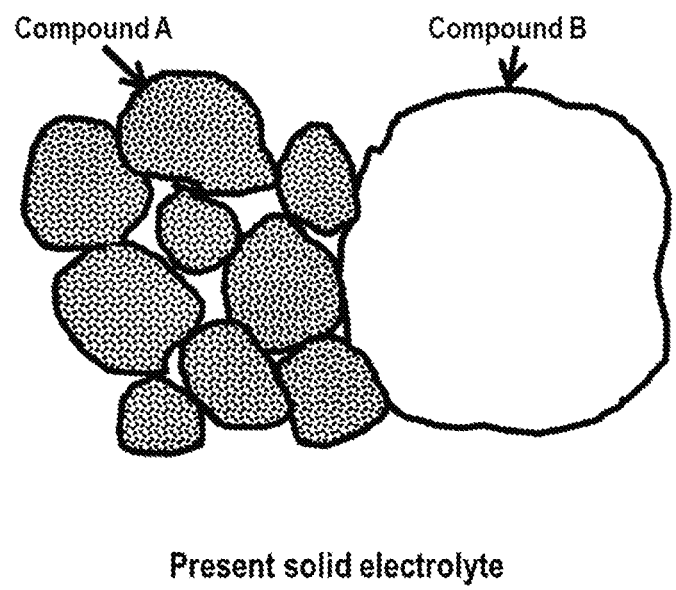

SULFIDE SOLID ELECTROLYTE AND BATTERY

CROSS-REFERENCE TO RELATED APPLICATIONS

This application is the United States national phase of International Application No. PCT/JP2019/043449 filed Nov. 6, 2019, and claims priority to Japanese Patent Application No. 2018-210466 filed Nov. 8, 2018, the disclosures of which are hereby incorporated by reference in their entirety.

TECHNICAL FIELD

The present disclosure relates to a sulfide solid electrolyte.

BACKGROUND ART

An all-solid battery does not require a flammable organic solvent. Therefore, simplification of safety devices can be attempted, and the battery can be excellent in terms of production cost and productivity. Also, the battery has a feature that solid electrolytes can be laminated in series in a cell, to achieve high voltage. Further, in a solid electrolyte used for the all-solid battery, since nothing but lithium ions moves and side reactions caused by movement of anions do not occur, it is expected that this leads to improvement of safety and durability.

As a substance used for the solid electrolyte of the all-solid battery, a sulfide solid electrolyte containing a lithium (Li) element, a phosphorus (P) element, and a sulfur (S) element, is attracting attention.

For example, Japanese Patent Laid-Open No. JP 2013-137889 discloses a sulfide solid electrolyte having a framework structure of $Li_7PS_6$ and a compositional formula: $Li_{7+x}P_{1-y}Si_yS_6$ (wherein x is −0.6 to 0.6 and y is 0.1 to 0.6) in which a part of P is substituted by Si.

International Patent Application Publication No. WO 2015/001818 discloses a crystalline solid electrolyte being represented by a compositional formula: $Li_xSi_yP_zS_aHa_w$ (wherein, Ha includes one or two or more of Br, Cl, I, and F, and 2.4<(x−y)/(y+z)<3.3), in which the content of S is 55 to 73% by mass, the content of Si is 2 to 11% by mass, and the content of a Ha element is 0.02% by mass or more.

International Patent Application Publication No. WO 2015/012042 discloses a sulfide solid electrolyte for a lithium ion battery, which contains a compound having a cubic crystal structure belonging to a space group F-43m and being represented by a compositional formula: $Li_{7-x}PS_{6-x}Ha_x$ (Ha is either Cl or Br), in which x in the compositional formula is 0.2 to 1.8, and a value of the lightness L* in the L*a*b* color system is 60.0 or more.

Japanese Patent Laid-Open No. 2016-024874 discloses a sulfide solid electrolyte for a lithium ion battery, which contains a compound having a cubic argyrodite-type crystal structure and being represented by a compositional formula (1): $Li_{7-x-2y}PS_{6-x-y}Cl_x$, in which in the compositional formula (1), conditions: 0.8≤x≤1.7 and 0<y≤−0.25×+0.5 are satisfied.

International Patent Application Publication No. WO 2018/047566 discloses a sulfide solid electrolyte containing lithium, phosphorus, sulfur, chlorine, and bromine; and having a diffraction peak A at 2θ=25.2±0.5 deg and a diffraction peak B at 2θ=29.7±0.5 deg in an X-ray diffraction using CuKα rays.

In general, the sulfide solid electrolyte containing a sulfur-containing compound as described above has a high ionic conductivity and at the same time has an extremely high reactivity with moisture and oxygen, and thus a hydrogen sulfide gas may be generated, for example, when exposed to moisture in the atmosphere. For this reason, there has been a problem of the need to handle in a limited environment such as a dry room where an inert gas having an extremely low dew point is constantly supplied. Therefore, with regard to such a sulfide solid electrolyte, proposals have been made to improve the moisture resistance.

For example, International Publication Application Publication No. WO 2018/003333 discloses a novel sulfide solid electrolyte capable of suppressing hydrogen sulfide from being generated by reaction with moisture even in contact with dry air in a dry room or the like, and yet capable of securing lithium ionic conductivity. Specifically, a sulfide solid electrolyte for a lithium secondary battery containing lithium, phosphorus, sulfur, and a halogen, in which the surface of a compound having a cubic argyrodite-type crystal structure is coated with a compound having a non-argyrodite-type crystal structure and containing lithium, phosphorus, and sulfur, is disclosed.

Japanese Patent Laid-Open No. 2018-067552 discloses a sulfide solid electrolyte capable of suppressing hydrogen sulfide from being generated by reaction with moisture, and capable of securing lithium ionic conductivity. Specifically, a sulfide solid electrolyte for a lithium secondary battery containing lithium, phosphorus, sulfur, and a halogen, in which the surface of a compound having a cubic argyrodite-type crystal structure is coated with a compound having a non-argyrodite-type crystal structure and containing lithium, phosphorus, and sulfur; and the compound having a non-argyrodite-type crystal structure is a compound having an orthorhombic or triangular crystal structure, is disclosed.

CITATION LIST

Patent Document 1: Japanese Patent Laid-Open No. 2013-137889

Patent Document 2: International Publication No. WO 2015/001818

Patent Document 3: International Publication No. WO 2015/012042

Patent Document 4: Japanese Patent Laid-Open No. 2016-024874

Patent Document 5: International Publication No. WO 2018/047566

Patent Document 6: International Publication No. WO 2018/003333

Patent Document 7: Japanese Patent Laid-Open No. 2018-067552

SUMMARY OF THE INVENTION

The present disclosure that relates to a sulfide solid electrolyte containing a lithium (Li) element, a phosphorus (P) element, a sulfur (S) element, and a halogen (X) element, is to provide a novel sulfide solid electrolyte capable of suppressing the generation of a hydrogen sulfide gas even when exposed to moisture in the atmosphere.

The present disclosure proposes a sulfide solid electrolyte comprising a compound (referred to as "component A") having an argyrodite-type structure and containing a lithium (Li) element, a phosphorus (P) element, a sulfur (S) element, and a halogen (X) element; and a compound (referred to as "component B") composed of a lithium (Li) element, a chlorine (Cl) element, and a bromine (Br) element and having a peak at each position of 2θ=29.1°±0.5° and 33.7°±0.5° in an X-ray diffraction pattern measured by an X-ray diffraction apparatus (XRD) using CuKα1 rays.

The sulfide solid electrolyte proposed by the present disclosure comprises a compound A having an argyrodite-type structure and containing a lithium (Li) element, a phosphorus (P) element, a sulfur (S) element, and a halogen (X) element; and a compound B composed of a lithium (Li) element, a chlorine (Cl) element, and a bromine (Br) element and having a peak at predetermined positions in an X-ray diffraction pattern measured by the XRD using CuKα1 rays, thereby enabling the suppression of the generation of a hydrogen sulfide gas more effectively than conventional solid electrolytes even when exposed to moisture in the atmosphere.

BRIEF DESCRIPTION OF DRAWINGS

FIG. 1 shows X-ray diffraction patterns obtained by measuring a compound B ($LiCl_{0.5}Br_{0.5}$ in the figure) produced in Example, lithium chloride (LiCl) used in producing the compound B, and lithium bromide (LiBr) also used in producing the compound B, with an X-ray diffraction method.

FIG. 2 shows X-ray diffraction patterns obtained by measuring sulfide solid electrolytes (samples) obtained in Examples 1 to 5 and Comparative Example 1, with an X-ray diffraction method.

FIG. 3 shows the results of measuring the amount of hydrogen sulfide generated from sulfide solid electrolytes (samples) obtained in Example 3 and Comparative Example 1.

FIG. 4 is an image figure showing an example of the sulfide solid electrolyte in the present disclosure.

DESCRIPTION OF THE INVENTION

Next, the present disclosure will be described based on exemplary embodiments. However, the present disclosure is not limited to the embodiments that will be described below.

<Present Solid Electrolyte>

The sulfide solid electrolyte according to an example of the embodiments of the present disclosure (referred to as "present solid electrolyte") comprises a compound A having an argyrodite-type structure and containing a lithium (Li) element, a phosphorus (P) element, a sulfur (S) element, and a halogen (X) element; and a compound B composed of a lithium (Li) element, a chlorine (Cl) element, and a bromine (Br) element and having a peak at each position of 2θ=29.1°±0.5° and 33.7°±0.5° in an X-ray diffraction pattern measured by an X-ray diffraction apparatus (XRD) using CuKα1 rays. Here, it is preferable that the peaks are respectively independently present without being overlapped with other peaks.

The present solid electrolyte comprises a compound A having an argyrodite-type structure and containing a lithium (Li) element, a phosphorus (P) element, a sulfur (S) element, and a halogen (X) element; and a compound B composed of a lithium (Li) element, a chlorine (Cl) element, and a bromine (Br) element and having a peak at predetermined positions in an X-ray diffraction pattern measured by the XRD using CuKα1 rays, thereby enabling the suppression of the generation of a hydrogen sulfide gas effectively when exposed to moisture in the atmosphere. The reason why such an effect is obtained is not clear, but the following can be presumed. The present solid electrolyte can be obtained by further adding the compound B to the compound A having an argyrodite-type structure. Therefore, as shown in, for example, FIG. 4, the compound A and the compound B are respectively independently present in the present solid electrolyte. The surface area of the present solid electrolyte in which the compound A and the compound B are respectively independently present is the sum of the surface areas of the compound A and the compound B. In the present disclosure, it is presumed that the present solid electrolyte is able to suppress the generation amount of hydrogen sulfide per unit surface area by containing the compound B having moisture resistance, compared with a conventional solid electrolyte in which most of the surface area of the solid electrolyte is attributed to the compound A. Further, in the present solid electrolyte, the compound B is independently present, and the compound A is also independently present. Therefore, it is presumed that the present solid electrolyte is able to secure a lithium ion conduction path by the compound A contained therein, and to maintain good battery characteristics.

Here, the term "sulfide solid electrolyte" means a solid electrolyte containing a compound containing sulfur, that is, a sulfur-containing compound. Also, the "solid electrolyte" refers to a solid body having Li ionic conductivity that can be used as a substitute for an electrolyte solution or a separator, for example, in designing a battery, but not a film (so-called SEI (Solid Electrolyte Interphase)) generated at the electrode material interface in an initial charge and discharge reaction or the like after producing a battery.

The present solid electrolyte may be particles or powder. The present solid electrolyte is a crystalline material. However, the present solid electrolyte may contain a glass component, that is, an amorphous component.

The present solid electrolyte contains the compound A having an argyrodite-type structure and containing a lithium (Li) element, a phosphorus (P) element, a sulfur (S) element, and a halogen (X) element. Thus, the present solid electrolyte has a peak at predetermined positions belonging to the compound A in an X-ray diffraction pattern measured by the X-ray diffraction apparatus (XRD) using CuKα1 rays.

Specifically, the compound A and the present solid electrolyte preferably have a peak at, for example, 2θ=15.34°±1.00°, 17.74°±1.00°, 25.19°±1.00°, 29.62°±1.00°, 30.97°±1.00°, 44.37°±1.00°, 47.22°±1.00°, and 51.70°±1.00° in the X-ray diffraction pattern. It can be said that these peaks are characteristic peaks in the argyrodite-type structure.

In addition to the above peaks, the compound A and the present solid electrolyte may have a peak at, for example, 2θ=54.26°±1.00°, 58.35°±1.00°, 60.72°±1.00°, 61.50°±1.00°, 70.46°±1.00°, and 72.61°±1.00°.

Here, it is preferable that the peaks are respectively independently present without being overlapped with other peaks. It can be confirmed if the crystal phase having an argyrodite-type structure is not contained by having no characteristic peak of the argyrodite-type structure as described above.

The present solid electrolyte contains the compound B composed of a lithium (Li) element, a chlorine (Cl) element, and a bromine (Br) element. Thereby, in an X-ray diffraction pattern measured by the X-ray diffraction apparatus (XRD) using CuKα1 rays, peaks belonging to the compound B are present. That is, the compound B and the present solid electrolyte have a peak at each position of 2θ=29.1°±0.5° and 33.7°±0.5° in the X-ray diffraction pattern.

The each of the peaks of the compound B is located in the middle of the peaks respectively belonging to LiCl and LiBr, as shown in, for example, FIG. 1 described later. These peaks are coincident with, for example, peaks of a solid solution $LiCl_{0.5}Br_{0.5}$ of LiCl and LiBr obtained by mixing LiCl and LiBr and heating the mixture at 500° C. in an argon gas atmosphere.

The peak present at 2θ=29.1°±0.5° is preferably present at 2θ=29.1°±0.3°, more preferably 2θ=29.1°±0.2°, and even more preferably 2θ=29.1°±0.1°.

The peak present at 2θ=33.7°±0.5° is preferably present at 2θ=33.7°±0.3°, more preferably 2θ=33.7°±0.2°, and even more preferably 2θ=33.7°±0.1°.

Further, the compound B and the present solid electrolyte preferably have a peak, for example, at each position of 2θ=49.0°±0.5°, 58.0°±0.5°, and 60.0°±0.5° in the X-ray diffraction pattern measured by the X-ray diffraction apparatus (XRD) using CuKα1 rays, in addition to the above peaks.

Here, the peak present at 2θ=49.0°±0.5° is preferably present at 2θ=49.0°±0.3°, more preferably 2θ=49.0°±0.2°, and even more preferably 2θ=49.0°±0.1°.

The peak present at 2θ=58.0°±0.5° is preferably present at 2θ=58.0°±0.3°, more preferably 2θ=58.0°±0.2°, and even more preferably 2θ=58.0°±0.1°.

The peak present at 2θ=60.0°±0.5° is preferably present at 2θ=60.0°±0.3°, more preferably 2θ=60.0°±0.2°, and even more preferably 2θ=60.0°±0.1°.

The present solid electrolyte may have a peak located at 2θ=30.2°±0.5° in the X-ray diffraction pattern measured by the X-ray diffraction apparatus (XRD) using CuKα1 rays. The peak belongs to the crystal phase of the argyrodite-type structure.

In the present solid electrolyte, when the intensity of the peak located at 2θ=30.2°±0.5° is defined as IA and the intensity of the peak located at 2θ=29.1°±0.5° is defined as $I_B$ in the X-ray diffraction pattern measured by the X-ray diffraction apparatus (XRD) using CuKα1 rays, the ratio $(I_A/I_B)$ of the $I_A$ to the $I_B$ preferably satisfies $0<I_A/I_B≤3.5$. Among them, the ratio $(I_A/I_B)$ more preferably satisfies, for example, $0.1≤I_A/I_B$, and even more preferably $0.6≤I_A/I_B$. In addition, the ratio $(I_A/I_B)$ more preferably satisfies, for example, $I_A/I_B≤3.5$, even more preferably $I_A/I_B≤3.0$, and still more preferably $I_A/I_B≤2.5$. When the peak intensity ratio has the predetermined lower limit, the generation of hydrogen sulfide can be more effectively suppressed. Further, when the peak intensity ratio has the predetermined upper limit, the lithium ion conduction path is secured, and the battery characteristics can be maintained more satisfactorily.

In the X-ray diffraction pattern, whether or not a peak is present in each region can be determined as follows. For example, the presence or absence of a peak in a region of 2θ=49.0°±0.5°, can be determined by whether or not to have a ratio (B/A) of 1.01 or more, preferably 1.05 or more, and more preferably 1.10 or more, when the average value of the X-ray intensities (counts) at 2θ=48.0°±0.5° and 2θ=50.0°±0.5° is defined as intensity A of the background (BG) and the maximum value of the X-ray intensity (counts) at 2θ=49.0°±0.5° is defined as peak intensity B in the X-ray diffraction pattern. The same applies to the case where it is determined whether or not other peaks are present in predetermined regions. The method for measuring the X-ray intensity can be the same as the method described in the section of each Examples described later.

In the present solid electrolyte, the ratio ((Cl+Br)/P) of the total content (mol) of a chlorine (Cl) element and a bromine (Br) element to the content (mol) of a phosphorus (P) element preferably satisfies 1.6<(Cl+Br)/P<20.0. More preferably, the ratio satisfies 1.7≤(Cl+Br)/P in the present disclosure. Also, more preferably, the ratio satisfies (Cl+Br)/P≤2.4, and even more preferably (Cl+Br)/P≤2.1 in the present disclosure.

Here, the content (mol) of each of the phosphorus (P) element, the chlorine (Cl) element, and the bromine (Br) element can be confirmed by completely dissolving, for example, the present solid electrolyte and measuring by the ICP method.

In the present solid electrolyte, when the particle diameter of the compound A is defined as $D_{50A}$, and the particle diameter of the compound B is defined as $D_{50B}$, the $D_{50A}$ and the $D_{50B}$ preferably satisfy $1<(D_{50A}+D_{50B})/D_{50A}$. When the particle diameters of the compound A and the compound B in the present solid electrolyte satisfy the above formula, the compound A and the compound B can be independently present in the present solid electrolyte as shown in, for example, FIG. 4. The upper limit of the ratio $(D_{50A}+D_{50B})/D_{50A}$ in the present disclosure is not particularly limited, and it may satisfy, for example, $(D_{50A}+D_{50B})/D_{50A}<1,500$, $(D_{50A}+D_{50B})/D_{50A}<1,000$, $(D_{50A}+D_{50B})/D_{50A}<500$, $(D_{50A}+D_{50B})/D_{50A}<200$, or $(D_{50A}+D_{50B})/D_{50A}<100$.

Here, each of the particle diameter $(D_{50A})$ of the compound A and the particle diameter $(D_{50B})$ of the compound B refers to a $D_{50}$ according to a volume-based particle size distribution obtained via measurement by a laser diffraction scattering-type particle size distribution measurement method, as described later.

(Compound A)

The compound A having an argyrodite-type structure and containing a lithium (Li) element, a phosphorus (P) element, a sulfur (S) element, and a halogen (X) element may be present as a crystal phase or as a compound in the present solid electrolyte.

The "argyrodite-type structure" means a structure of a group of compounds derived from a mineral represented by a chemical formula: $Ag_8GeS_6$. Whether or not the present solid electrolyte has the argyrodite-type structure can be confirmed by, for example, XRD measurement as described above.

The compound A is usually a crystalline material containing a crystal phase having the argyrodite-type structure. However, a glass component, that is, an amorphous component may be contained therein.

The crystal phase having the argyrodite-type structure is usually a cubic crystal phase.

The compound A may contain a crystal phase having the argyrodite-type structure. Here, the term "compound A contains a crystal phase having an argyrodite-type structure" means that it is sufficient as long as the compound A contains at least a crystal phase having an argyrodite-type structure, and may contain a crystal phase (also referred to as "different phase") different from the crystal phase having an argyrodite-type structure. The compound A may not contain the different phase. Examples of the compound constituting the different phase may include $Li_3PS_4$ and lithium halide.

In the compound A, the ratio of the crystal phase having the argyrodite-type structure to the total crystal phase constituting the compound A may be, for example, may be 10% by mass or more, may be 20% by mass or more, or may be 50% by mass or more. In particular, the compound A preferably contains the crystal phase having the argyrodite-type structure as a main phase. Here, the term "main phase" refers to a phase having the largest ratio to the total amount of all the crystal phases constituting the compound A. Therefore, in the compound A, the ratio of the crystal phase having the argyrodite-type structure to the total crystal phases constituting the compound A is preferably, for example, 60% by mass or more, more preferably 70% by mass or more, even more preferably 80% by mass or more, and still more preferably 90% by mass or more.

The ratio of the crystal phase can be determined by, for example, calculating a content ratio (% by mass) by analysis of an X-ray diffraction (XRD) pattern.

Examples of the halogen (X) element contained in the compound A may include a fluorine (F) element, a chlorine (Cl) element, a bromine (Br) element, and an iodine (I) element. The halogen (X) element contained in the compound A may be one or a combination of two or more elements thereof. Among them, the halogen (X) element is preferably a chlorine (Cl) element or a bromine (Br) element, and is preferably a combination of a chlorine (Cl) element and a bromine (Br) element.

Examples of the composition of the compound A may include a compositional formula (1): $Li_{7-a}PS_{6-a}X_a$ (X represents one or two or more halogen (X) elements, and "a" satisfies $0.2<a\leq2.0$).

In the compositional formula (1), "a" indicating the molar ratio of the halogen (X) element is preferably more than 0.2 and 2.0 or less, more preferably 0.4 or more or 1.7 or less, and even more preferably 0.5 or more or 1.65 or less.

When the "a" falls within such a range, the argyrodite-type structure becomes stable in the vicinity of a room temperature, and high ionic conductivity can be secured. In addition, a $PS_4$ structure, which is a basic framework of the argyrodite-type structure, can be easily generated, and the conductivity of lithium ions can be effectively enhanced.

On the other hand, from the viewpoint of further reducing sulfur deficiency, the "a" indicating the molar ratio of the halogen (X) element in the compositional formula (1) is preferably 1.4 or more, more preferably 1.5 or more, and even more preferably 1.55 or more.

In the case where the halogen (X) element is a combination of a plurality of elements (for example, a chlorine (Cl) element and a bromine (Br) element), the "a" in the compositional formula (1) is the sum of the molar ratio of each element.

Meanwhile, the compound A may contain an element other than the lithium (Li) element, the phosphorus (P) element, the sulfur (S) element, and the halogen (X) element. For example, a part of the lithium (Li) element can be replaced with another alkali metal element, a part of the phosphorus (P) element can be replaced with another pnictogen element, and a part of the sulfur (S) element can be replaced with another chalcogen element.

As described above, the compound A may contain, for example, unavoidable impurities in addition to the lithium (Li) element, the phosphorus (P) element, the sulfur (S) element, and the halogen (X) element. The content of the unavoidable impurities in the compound A can be, for example, less than 5 mol %, preferably less than 3 mol %, and more preferably less than 1 mol % from the viewpoint of reducing the influence on the performance.

The compound A may have a $D_{50A}$, (referred to "average particle diameter ($D_{50A}$)" or "$D_{50A}$"), according to a volume-based particle size distribution obtained via measurement by a laser diffraction scattering-type particle size distribution measurement method, of, for example, 0.1 μm or more and 150.0 μm or less. The average particle diameter ($D_{50A}$) of the compound A may be, for example, 0.1 μm or more, may be 0.3 μm or more, or may be 0.5 μm or more. In addition, the average particle diameter ($D_{50A}$) of the compound A may be, for example, 50.0 μm or less, may be 10.0 μm or less, may be 5.0 μm or less, or may be 1.0 μm or less.

(Compound B)

The present solid electrolyte is able to suppress the generation of a hydrogen sulfide gas when exposed to moisture in the atmosphere by containing the compound B composed of a lithium (Li) element, a chlorine (Cl) element, and a bromine (Br) element.

The compound B may be present in the present solid electrolyte as compound particles.

Examples of the compound B may include a solid solution of LiCl and LiBr. This can be produced by, for example, mixing LiCl and LiBr and reacting the mixture in an inert atmosphere by heating.

The element ratio (molar ratio) of the chlorine (Cl) element and the bromine (Br) element in the compound B is not particularly limited. For example, the ratio of Cl:Br may be 90:10 to 10:90, may be 80:20 to 20:80, or may be 75:25 to 25:75. In the present disclosure, the ratio of Cl:Br may be 50:50.

The compound B may have a $D_{50B}$ (referred to "average particle diameter ($D_{50B}$)" or "$D_{50B}$"), according to a volume-based particle size distribution obtained via measurement by a laser diffraction scattering-type particle size distribution measurement method, of, for example, 0.1 μm or more and 100 μm or less. The average particle diameter ($D_{50B}$) of the compound B may be, for example, 0.1 μm or more, may be 0.3 μm or more, or may be 0.5 μm or more. In addition, the average particle diameter ($D_{50B}$) of the compound B may be, for example, 100.0 μm or less, may be 70.0 μm or less, may be 50.0 μm or less, may be 10.0 μm or less, may be 5.0 μm or less, or may be 1.0 μm or less.

(Other Components)

The present solid electrolyte may or may not contain "other phases or compounds" other than the compound A and the compound B.

Examples of the "other phases or compounds" may include $Li_3PS_4$, $LiX_2$ (X represents a halogen), and lithium halide.

(Present Solid Electrolyte)

As a preferable composition example of the present solid electrolyte, for example, a compositional formula: $Li_bP_cS_d$-$Cl_eBr_f$ (e, f, and c in the formula satisfy $1.6<e+f/c\leq7.0$, and b and d are arbitrary real numbers) can be cited.

In the formula, e, f, and c preferably satisfy $1.7\leq e+f/c$. In addition, e, f, and c in the formula preferably satisfy $e+f/c\leq6.4$, more preferably $e+f/c\leq2.4$, and even more preferably $e+f/c\leq2.1$.

Such a composition can be obtained by using a chlorine (Cl) element or a bromine (Br) element, or both of them as the halogen (X) element of the compound A, and by appropriately adjusting the mixing ratio of the compounds A and B. The value of "e+f/c" in the formula can also be measured, for example, by completely dissolving the present solid electrolyte, by the ICP method.

The content of the compound B in the present solid electrolyte is not particularly limited as long as the effect of the present disclosure may be obtained. The specific content of the compound B may be 1% by mass or more, may be 5% by mass or more, or may be 10% by mass or more. In addition, the content of the compound B in the present solid electrolyte may be, for example, 100% by mass or less, may be 80% by mass or less, may be 50% by mass or less, or may be 20% by mass or less.

The contents of the compounds A and B can be calculated from the results of XRD measurement.

(Particle Diameter)

The form of the present solid electrolyte may be particles, and the particle diameter thereof will be described below.

The present solid electrolyte preferably has a $D_{50}$ (referred to "average particle diameter ($D_{50}$)" or "$D_{50}$"), according to a volume-based particle size distribution obtained via measurement by a laser diffraction scattering-type particle size distribution measurement method, of 0.1 μm or more and 150 μm or less.

When the $D_{50}$ of the present solid electrolyte is 0.1 μm or more, an increase in the surface area of the whole powder composed of, for example, the present solid electrolyte can be suppressed, and the occurrence of troubles such as an increase in resistance and difficulty in mixing with active materials, can be suppressed. In addition, when the $D_{50}$ of the present solid electrolyte is 150 μm or less, the present solid electrolyte is easily entered into the gap or the like of other solid electrolytes or active materials used in combination with the present solid electrolyte. Thereby, the contact point and the contact area of the solid electrolyte are increased, and the ionic conductivity can be improved.

From such a viewpoint, the average particle diameter ($D_{50}$) of the present solid electrolyte is preferably, for example, 0.1 μm or more, more preferably 0.3 μm or more, and even more preferably 0.5 μm or more. In addition, the average particle diameter ($D_{50}$) of the present solid electrolyte is preferably, for example, 150.0 μm or less, more preferably 70.0 μm or less, and even more preferably 50.0 μm or less.

The average particle diameter ($D_{50}$) of the present solid electrolyte when the present solid electrolyte is added into the electrodes is preferably 1% or more and 100% or less of the average particle diameter ($D_{50}$) of the positive electrode active material or the average particle diameter ($D_{50}$) of the negative electrode active material, more preferably 3% or more or 50% or less thereof, and even more preferably 5% or more or 30% or less thereof.

When the average particle diameter ($D_{50}$) of the present solid electrolyte falls within the above range, the space of the positive electrode active material or the negative electrode active material (collectively referred to as "active material") can be filled without gaps, and the filling rate of the electrode can be increased.

<Method for Producing Present Solid Electrolyte>

Next, an example of the method for producing the present solid electrolyte will be described. However, the method for producing the present solid electrolyte is not limited to the method described herein.

(Mixing Production Method)

The present solid electrolyte can be produced, for example, as described below.

The solid electrolyte can be produced by mixing the compound A having an argyrodite-type structure and containing a lithium (Li) element, a phosphorus (P) element, a sulfur (S) element, and a halogen (X) element, with the compound B composed of a lithium (Li) element, a chlorine (Cl) element, and a bromine (Br) element.

(Compound A)

The compound A used in the mixing production method is not particularly limited as long as it is a compound having an argyrodite-type structure and containing a lithium (Li) element, a phosphorus (P) element, a sulfur (S) element, and a halogen (X) element, and thus generally known materials can be used.

As a method for producing the compound A, for example, a method in which predetermined raw materials are mixed to obtain a raw material mixture ("mixing step"), and the obtained raw material mixture is heated while allowing a hydrogen sulfide gas ($H_2S$) to flow ("calcination step") can be cited. However, the method is not limited to such a production method.

The raw materials are substances containing elements constituting the present solid electrolyte, and these are a substance containing a lithium (Li) element, a substance containing a sulfur (S) element, a substance containing a phosphorus (P) element, and a substance containing a halogen (X) element.

Examples of the substance containing a lithium (Li) element may include lithium compounds such as lithium sulfide ($Li_2S$), lithium oxide ($Li_2O$), and lithium carbonate ($Li_2CO_3$); and a lithium metal single substance. The substance may be used singly or in combination of two or more thereof.

Examples of the substance containing a sulfur (S) element may include phosphorus sulfides such as diphosphorus trisulfide ($P_2S_3$) and diphosphorus pentasulfide ($P_2S_5$). As the substance containing a sulfur (S) element, a sulfur (S) single substance can also be used.

Examples of the substance containing a phosphorus (P) element may include phosphorus sulfides such as diphosphorus trisulfide ($P_2S_3$) and diphosphorus pentasulfide ($P_2S_5$); a phosphorus compound such as sodium phosphate ($Na_3PO_4$); and a phosphorus single substance. The substance may be used singly or in combination of two or more thereof.

Examples of the substance containing an X (halogen) element may include a compound of one or two or more elements selected from the group consisting of fluorine (F), chlorine (Cl), bromine (Br), and iodine (I), and of one or two or more elements selected from the group consisting of sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), and bismuth (Bi); and a compound in which oxygen or sulfur is further bonded to the above compound. Specific examples thereof may include lithium halides such as LiF, LiCl, LiBr, and LiI; phosphorus halides such as $PF_3$, $PF_5$, $PCl_3$, $PCl_5$, $POCl_3$, $PBr_3$, $POBr_3$, $PI_3$, $P_2Cl_4$, and $P_2I_4$; sulfur halides such as $SF_2$, $SF_4$, $SF_6$, $S_2F_{10}$, $SCl_2$, $S_2Cl_2$, and $S_2Br_2$; sodium halides such as NaI, NaF, NaCl, and NaBr; and boron halides such as $BCl_3$, $BBr_3$, and $BI_3$. The substance may be used singly or in combination of two or more thereof. Among them, it is preferable to use lithium halides (LiX (X represents a halogen)).

The method for mixing the solid electrolyte raw materials is not particularly limited. For example, a paint shaker, a ball mill, a bead mill, or a homogenizer may be used for mixing.

However, when the mechanical milling method and the melt quenching method are employed for mixing and the mixture is subjected to excessive kinetic energy, a part or all of the sulfur or sulfur compound added in the stage of the mixing step is vaporized. Therefore, it is preferable not to employ the mechanical milling method and the melt quenching method.

The raw materials such as lithium sulfide and phosphorus sulfide are extremely unstable in the atmosphere, and are decomposed by reacting with moisture to generate a sulfide gas or to oxidize. Therefore, it is preferable to perform the mixing step in a glove box or the like replaced with an inert gas atmosphere.

The raw material mixture obtained in the mixing step may be subjected to treatments such as drying, stirring, washing, sieving, and classification, if necessary, and then may be supplied to a calcination step.

In the calcination step, the raw material mixture obtained in the mixing step is preferably heated and calcined while allowing a hydrogen sulfide gas ($H_2S$) to flow. The calcination step may be a one-stage calcination step, or a two-stage calcination step as in Examples described later.

The calcination temperature, that is, the highest achieving temperature of the product temperature at the time of calcining may be higher than 300° C. Among them, it is preferably 700° C. or lower, and more preferably 400° C. or higher or 600° C. or lower, from the viewpoint of causing the desired solid phase reaction and crystallization reaction.

The calcination time, that is, the time for heating to a temperature higher than 300° C., may be such that the solid phase reaction or the crystallization reaction of the mixture sufficiently proceeds, and is preferably appropriately adjusted by considering the mixing state of the mixture or the calcination temperature. Typically, the calcination time is preferably 1 hour or more and 10 hours or less, and more preferably 2 hours or more or 6 hours or less.

Here, the calcination temperature at this time means the product temperature, and can be measured, for example, by inserting a thermocouple into the calcining product.

After the calcination, the calcined product may be crushed and pulverized if necessary, and classified if necessary. For example, the calcined product is preferably crushed and pulverized using a pulverizer such as a planetary ball mill, a vibration mill, or a rolling mill, or a kneader or the like.

(Compound B)

The compound B used in the mixing production method can be produced by, for example, mixing LiCl and LiBr, and heating the mixture in an inert gas atmosphere. However, the method is not limited to such a production method.

Here, the heating temperature, that is, the highest achieving temperature of the product temperature and the heating time are not particularly limited as long as the desired compound B can be obtained.

The heating reaction can be performed in, for example, an inert gas atmosphere such as an argon gas.

(Production Method Other than Mixing)

The present solid electrolyte containing the compound A and the compound B can also be produced by, for example, adjusting the conditions when synthesizing the compound A as described above to generate the compound B as a different phase together with the crystal phase of the compound A.

<Application of Present Solid Electrolyte>

The present solid electrolyte can be used as a material constituting one or two or more layers of a solid electrolyte layer, a positive electrode layer, and a negative electrode layer. Therefore, the present solid electrolyte can be used in, for example, a battery having a solid electrolyte layer, that is, an all-solid battery. Specifically, it can be used in a lithium all-solid battery. The lithium all-solid battery may be a primary battery or a secondary battery.

<Present Battery>

Next, as an example of the embodiments of the present disclosure, a battery using the present solid electrolyte (referred to as "present battery') will be described.

The present battery has a positive electrode layer, a negative electrode layer, and a solid electrolyte layer between the positive electrode layer and the negative electrode layer, and contains the present solid electrolyte. In the present battery, for example, at least one of the negative electrode layer and the solid electrolyte layer preferably contains the present solid electrolyte. The present battery is a so-called all-solid battery.

Examples of the shape of the present battery may include a laminate-type, a cylindrical-type, and a square-type. The present solid electrolyte is excellent in moisture resistance, and has less degradation of the characteristics even when handled in dry air. Therefore, the operation of assembling the all-solid battery can be performed even in, for example, a dry room or the like.

Here, the solid electrolyte layer can be produced by, for example, a method in which a slurry composed of the present solid electrolyte, a binder, and a solvent is dropped on a substrate, and rubbed and cut with a doctor blade or the like, a method of cutting with an air knife after contacting the substrate with the slurry, or a method in which a coating film is formed by a screen printing method or the like, and the solvent is then removed through heating and drying processes. Alternatively, the layer can also be produced in such a manner that the powdered present solid electrolyte is pressed by a press or the like to produce a pressed powder, and then the pressed powder is appropriately processed.

In the solid electrolyte layer containing the present solid electrolyte, from the viewpoint of enhancing the lithium ionic conductivity, the porosity is preferably 50% or less, more preferably 30% or less, and even more preferably 20% or less. The porosity of the solid electrolyte layer can be adjusted by, for example, a press pressure used when the powdered present solid electrolyte is formed into a pressed powder. In the present disclosure, the press pressure is preferably, for example, 20 MPa or more.

Here, the porosity can be calculated from true density and apparent density of the solid electrolyte layer, which are obtained by a liquid-phase method (Archimedes method), according to a relational formula described below.

Porosity (%)=(true density−apparent density)÷true density×100

The thickness of the layer containing the present solid electrolyte is typically preferably 5 μm or more and 300 μm or less, and more preferably 10 μm or more or 100 μm or less, from the viewpoint of the balance between short circuit prevention and volume capacity density.

The present solid electrolyte can also be used as a solid electrolyte layer obtained by mixing the present solid electrolyte and other solid electrolytes. The present solid electrolyte can be used in combination with any of amorphous (glass), glass ceramics, and crystalline materials. Specific examples of the sulfide solid electrolyte may include $Li_2S$—$P_2S_5$ series, $Li_4P_2S_6$, and $Li_7P_3S_{11}$. The solid electrolyte to be combined may be a non-sulfide, for example, an oxide-based solid electrolyte.

As a positive electrode material constituting the positive electrode layer, a positive electrode material that is used as a positive electrode active material for a lithium ion battery can be appropriately used. For example, a positive electrode active material containing lithium, specifically, a spinel-type lithium transition metal oxide and a lithium metal oxide having a layered structure can be cited. By using a high-voltage system positive electrode material, the energy density can be improved.

As for the positive electrode material, in addition to the positive electrode active material, a conductive material or other materials, for example, a solid electrolyte may be contained therein, or the present solid electrolyte may be used as the solid electrolyte.

As a negative electrode material constituting the negative electrode layer, a negative electrode material that is used as a negative electrode active material for a lithium ion battery can be appropriately used. Since the present solid electrolyte is electrochemically stable, a carbon-based material such as graphite, artificial graphite, natural graphite, or non-graphitizing carbon (hard carbon), all of which are charged and discharged at a low electric potential (about 0.1 V vs. Li+/Li) that is of a lithium metal or equal to a lithium metal, can also be used. For this reason, the energy density of the all-solid battery can be greatly improved. In addition, silicon or tin promising as a high capacity material can also be used as the active substance. In a lithium secondary battery using a general electrolytic solution, the electrolytic solution is reacted with the active material during charging and discharging, and the surface of the active material is corroded, so that the battery characteristics are remarkably deteriorated. On the other hand, when the present solid electrolyte is used in place of the electrolyte solution and silicon or tin is used as the negative electrode active material, such a corrosion reaction does not occur, and the durability of the battery can be improved.

As for the negative electrode material, in addition to the negative electrode active material, a conductive material or other materials, for example, a solid electrolyte may be contained therein, or the present solid electrolyte may be used as the solid electrolyte.

<Explanation of Terms>

In the present disclosure, in the case of being expressed as "α or more" or "α≤" (α is an arbitrary number), the term includes the intention of "preferably larger than α"; and in the case of being expressed as "β or less" or "β≥" (β is an arbitrary number), the term includes the intention of "preferably smaller than β".

EXAMPLES

The present disclosure will be further described in detail with reference to Examples and Comparative Examples below.

(Compound A)

As for the compound A, a compound having an argyrodite-type structure was prepared. The composition of the compound A was $Li_{5.4}PS_{4.4}Cl_{0.8}Br_{0.8}$.

(Compound B)

As for the compound B, lithium chloride (LiCl) powder and lithium bromide (LiBr) powder were added at a ratio of 50:50, and then pulverized and mixed with a planetary ball mill for 10 hours. The resultant mixed powder was heated in an argon gas (Ar) atmosphere to maintain 500° C. (product temperature) for 2 hours, thereby obtaining a compound B ($LiCl_{0.5}Br_{0.5}$).

Example 1

The compound A and the compound B were mixed in a mortar to obtain a solid electrolyte (sample). At this time, the content of the compound B in the solid electrolyte (sample) was set to 1% by mass.

Example 2

A solid electrolyte (sample) was obtained in the same manner as in Example 1 except that the content of the compound B was mixed at 5% by mass.

Example 3

A solid electrolyte (sample) was obtained in the same manner as in Example 1 except that the content of the compound B was mixed at 10% by mass.

Example 4

A solid electrolyte (sample) was obtained in the same manner as in Example 1 except that the content of the compound B was mixed at 20% by mass.

Example 5

A solid electrolyte (sample) was obtained in the same manner as in Example 1 except that the content of the compound B was mixed at 50% by mass.

Reference Example 1

A solid electrolyte (sample) was obtained in the same manner as in Example 1 except that the content of the compound B was mixed at 80% by mass.

Reference Example 2

A solid electrolyte (sample) was obtained by using only the compound B.

Comparative Example 1

The compound A was used as a solid electrolyte (sample).

In each of Examples 1 to 5, Reference Examples 1 and 2, and Comparative Example 1, the solid electrolyte (sample) was prepared such that the total amount of the compound A and compound B was the same.

<Measurement of Element Composition>

The solid electrolyte (sample) obtained in each of Examples 1 to 5, Comparative Example 1, and Reference Examples 1 and 2 was completely dissolved to measure the element composition (P, Cl, and Br) by ICP emission spectrometry. The measurement results are shown in Table 1.

<X-Ray Diffraction Measurement>

The compound B, and lithium chloride (LiCl) and lithium bromide (LiBr) used when the compound B was produced, were analyzed by an X-ray diffraction method (XRD, Cu ray source) to obtain an X-ray diffraction pattern, and the peak intensity (counts) at each position was measured. The results are shown in FIG. 1.

The measurement was performed using an XRD apparatus "Smart Lab" manufactured by Rigaku Corporation in atmospheric non-exposure, under the conditions of a scanning axis of 2θ/θ, a scanning range of 10° or more and 140° or less, a step width of 0.01°, and a scanning speed of 1°/min. As an internal standard, 5% by mass of Si powder (purity of 99.9%, manufactured by Wako Pure Chemical Industries Ltd.) was mixed and used for angle correction. The X-ray source was a CuKα1 ray using a Johansson-type crystal, and the measurement was performed by a one-dimensional detector.

As shown in FIG. 1, the compound B has a peak at each position of 2θ=29.1°±0.5° and 33.7°±0.5° (the top pattern in FIG. 1). These peaks are respectively located in the middle of the peaks belonging to LiCl (the bottom pattern in FIG. 1) and LiBr (the middle pattern in FIG. 1), and thus it can be considered that the compound B is a solid solution of LiCl and LiBr.

Also, the compound A was analyzed by the X-ray diffraction (XRD, Cu ray source) method in the same manner as described above to obtain an X-ray diffraction pattern, and the peak intensity (counts) at each position was measured. As the result, it is confirmed that the compound A has an argyrodite-type structure.

At this time, the data of PDF number 00-034-0688 was used for the identification of the peaks derived from the argyrodite-type crystal structure.

Furthermore, the solid electrolyte (sample) obtained in each of Examples 1 to 5 and Comparative Example 1 was also analyzed by the X-ray diffraction (XRD, Cu ray source) method in the same manner as described above to obtain an X-ray diffraction pattern, and the peak intensity (counts) at each position was measured (see FIG. 2).

As the result, it is confirmed that the solid electrolyte (sample) obtained in each of Examples 1 to 5 has peaks at $2\theta=54.26°\pm1.00°$, $58.35°\pm1.00°$, $60.72°\pm1.00°$, $61.50°\pm1.00°$, $70.46°\pm1.00°$, and $72.61°\pm1.00°$ in addition to the peaks derived from the argyrodite-type structure, that is, the peaks at $2\theta=15.34°\pm1.00°$, $17.74°\pm1.00°$, $25.19°\pm1.00°$, $29.62°\pm1.00°$, $30.97°\pm1.00°$, $44.37°\pm1.00°$, $47.22°\pm1.00°$, and $51.70°\pm1.00°$; and has peaks at $2\theta=49.0°\pm0.5°$, $58.0°\pm0.5°$, and $60.0°\pm0.5°$ in addition to the peaks derived from the compound B, that is, the peaks at $2\theta=29.1°\pm0.5°$ and $33.7°\pm0.5°$.

In the obtained X-ray diffraction pattern, the ratio ($I_A/I_B$) of the $I_A$ to the $I_B$ was determined when the intensity of the peak located at $2\theta=30.2°\pm0.5°$ was defined as $I_A$, and the intensity of the peak located at $2\theta=29.1°\pm0.5°$ was defined as $I_B$. The results are shown in Table 2.

<Measurement of Generation Amount of Hydrogen Sulfide ($H_2S$)>

The solid electrolyte (sample) obtained in each of Examples 1 to 5 and Comparative Example 1 was weighed 50 mg each in a glove box replaced with a sufficiently dried Ar gas (dew point of −60° C. or less), and was put in a bag sealed with a laminate film. Thereafter, a separable flask made of glass having a capacity of 1,500 cm$^3$ was placed in a thermo-hygrostat maintained at room temperature (25° C.) in a −30° C. dew point atmosphere adjusted by mixing dry air and the atmosphere, and was left to stand till the inside of the separable flask became the same as the environment in the thermo-hygrostat. Then, the sealed bag containing the sample was opened in the thermo-hygrostat, and the sample was quickly placed in the separable flask. As for hydrogen sulfide generated in 60 minutes just after placing the sample in the separable flask and sealing the flask, the concentration of the hydrogen sulfide after a lapse of 60 minutes was measured using a hydrogen sulfide sensor (GX-2009, manufactured by Riken Keiki Co., Ltd.). Then, the volume of the hydrogen sulfide was calculated from the concentration of the hydrogen sulfide after the lapse of 60 minutes to determine a generation amount of the hydrogen sulfide after the lapse of 60 minutes. The results are shown in Table 1. Also, the results of Example 3 and Comparative Example 1 are shown in FIG. 3.

From the results of Examples 1 to 5, it is found that the solid electrolyte containing the compound B composed of Li, Cl, and Br, in addition to the compound A having an argyrodite-type structure and containing Li, P, S, and a halogen, is able to effectively suppress the generation of a hydrogen sulfide gas when exposed to moisture in the atmosphere, compared with the solid electrolyte containing only the compound A and not containing the compound B in Comparative Example 1.

<Measurement of Particle Size Distribution ($D_{50}$)>

As for the compounds A and B, each of the $D_{50A}$, and $D_{50B}$ was measured using an automatic sample feeder for laser diffraction particle diameter distribution measuring apparatus ("Microtorac SDC", manufactured by Nikkiso Co., LTD.). Specifically, it was measured by the following method.

First, the sample (powder) dispersed in toluene was irradiated with ultrasonic waves of 40 W at a flow rate of 40% for 360 seconds more than once, and then the particle size distribution was measured using a laser diffraction particle size distribution measuring apparatus "MT3000II" manufactured by Nikkiso Co., LTD. Next, the $D_5O$ was measured from the chart of the obtained volume-based particle size distribution. The number of irradiation times of the ultrasonic waves was a number of times until the change rate of $D_{50}$ before and after the ultrasonic waves irradiation became 8% or less.

The water-soluble solvent at the time of the measurement was passed through a filter having a pore size of 60 μm. The measurement conditions were as follows; a solvent refractive index of 1.33, "penetration" for the particle penetrability conditions, a particle refractive index of 2.46, a "non-spherical" shape, a measurement range of 0.133 to 704.0 μm, a measurement time of 30 seconds, and the measurement was performed twice to obtain the average value.

<Measurement of Ionic Conductivity (mS/cm)>

The ionic conductivity (mS/cm) of the solid electrolyte (sample) obtained in each of Examples 1 to 5 and Comparative Example 1 was measured. The results are shown in Table 1.

TABLE 1

|  | | Particle size distribution | | | Content of element obtained by ICP |
| --- | --- | --- | --- | --- | --- |
|  | Compound B Content | $D_{50A}$ of Compound A (μm) | $D_{50B}$ of Compound B (μm) | $(D_{50A} + D_{50B})/D_{50A}$ (—) | P (% by mass) |
| Comparative Example 1 | — | 0.7 | — | 1.0 | 10.1 |
| Example 1 | 1% by mass | 0.7 | 47.5 | 68.9 | 9.86 |
| Example 2 | 5% by mass | 0.7 | 47.5 | 68.9 | 9.65 |
| Example 3 | 10% by mass | 0.7 | 47.5 | 68.9 | 8.89 |
| Example 4 | 20% by mass | 0.7 | 47.5 | 68.9 | 8.10 |
| Example 5 | 50% by mass | 0.7 | 47.5 | 68.9 | 4.95 |
| Reference Example 1 | 80% by mass | 0.7 | 47.5 | 68.9 | 1.99 |
| Reference Example 2 | 100% by mass | — | 47.5 | — | — |

TABLE 1-continued

|  | Content of element obtained by ICP | | Element ratio of present solid electrolyte (Cl + Br)/P | $H_2S$ generation amount $cm^3/g$ | Ionic conductivity mS/cm |
| --- | --- | --- | --- | --- | --- |
|  | Cl (% by mass) | Br (% by mass) | | | |
| Comparative Example 1 | 9.14 | 20.5 | 1.6 | 0.49 | 4.39 |
| Example 1 | 9.48 | 20.8 | 1.7 | 0.27 | 5.04 |
| Example 2 | 10.2 | 22.3 | 1.8 | 0.28 | 5.09 |
| Example 3 | 11.0 | 24.4 | 2.1 | 0.31 | 5.03 |
| Example 4 | 12.9 | 20.4 | 2.4 | 0.37 | 3.64 |
| Example 5 | 18.4 | 40.4 | 6.4 | 0.34 | 2.14 |
| Reference Example 1 | 23.5 | 52.9 | 20.6 | 0.30 | — |
| Reference Example 2 | — | — | — | 0.00 | — |

TABLE 2

|  | Compound B Content | Peak intensity ratio | | |
| --- | --- | --- | --- | --- |
|  |  | $I_A$ 30.2° ± 0.5° | $I_B$ 29.1° ± 0.5° | $I_A/I_B$ |
| Comparative Example 1 | — | 1850 | 503 | 3.68 |
| Example 1 | 1% by mass | 1441 | 649 | 2.22 |
| Example 2 | 5% by mass | 1508 | 1031 | 1.46 |
| Example 3 | 10% by mass | 1338 | 1380 | 0.97 |
| Example 4 | 20% by mass | 1371 | 1994 | 0.69 |
| Example 5 | 50% by mass | 1046 | 5973 | 0.18 |
| Reference Example 1 | 80% by mass | — | — | — |
| Reference Example 2 | 100% by mass | — | — | — |

<Production and Evaluation of All-Solid Battery Cell>

A positive electrode material or a negative electrode material blended with the solid electrolyte (sample) obtained in each of Examples 1 to 5, Reference Examples 1 and 2, and Comparative Example 1 was prepared, and an all-solid battery was produced to evaluate the battery characteristics (initial charge and discharge capacity).

(Materials)

A $LiNi_{0.5}Co_{0.2}Mn_{0.3}O_2$ (NCM) powder ($D_5O=6.7$ μm) which was a layered compound was used as the positive electrode active material, a graphite ($D_{50}=20$ μm) was used as the negative electrode active material, and the sample obtained in each of Examples 1 to 5, Reference Examples 1 and 2, and Comparative Example 1 was used as the solid electrolyte.

(Electrode Material Preparation)

The positive electrode material was prepared by mixing the positive electrode active material, the solid electrolyte, and a conductive additive (acetylene black) in a mortar at a mass ratio of 60:37:3, and uniaxially press-molded at 20 MPa to obtain a positive electrode material pellet.

The negative electrode material was prepared by mixing the graphite and the solid electrolyte in a mortar at a mass ratio of 64:36.

(Production of All-Solid Battery Cell)

The lower opening part of a cylinder (opening diameter of 10.5 mm, height of 18 mm) made of polypropylene, in which the upper and lower sides were opened, was closed with a positive electrode (made of SUS), and the positive electrode material pellet was placed on the positive electrode. The solid electrolyte was placed thereon, and uniaxially pressed at 180 MPa to form a positive electrode material and a solid electrolyte layer. Then, the negative electrode material was placed thereon, and the cylinder was closed with a negative electrode (made of SUS); and the system was uniaxially molded at 550 MPa to produce an all-solid battery cell having a three-layered structure of the positive electrode material having a thickness of about 100 μm, the solid electrolyte layer having a thickness of about 300 μm, and the negative electrode material having a thickness of about 20 μm. At this time, the production of the all-solid battery cell was performed in a glove box replaced with an argon gas having a dew point temperature of −60° C.

(Battery Characteristics Evaluation (Initial Charge and Discharge Capacity))

The battery characteristics were evaluated by placing the all-solid battery cell into an environmental tester maintained at 60° C. and connecting with a charge-discharge measurement apparatus. In charging and discharging the battery, 1 mA was defined as 1 C. The charge was performed up to 4.5 V at 0.1 C by the CC-CV mode to obtain an initial charge capacity. The discharge was performed up to 2.5 V at 0.1 C by the CC mode to obtain an initial discharge capacity.

(Battery Characteristics Evaluation (0.1 C Discharge Capacity, 5 C/0.1 C Capacity Retention Rate))

The battery characteristics were evaluated by placing the all-solid battery cell into an environmental tester maintained at 25° C. and connecting with a charge-discharge measurement apparatus. In charging and discharging the battery, 3 mA was defined as 1 C. The charge was performed up to 4.5 V at 0.1 C by the CC-CV mode to obtain an initial charge capacity. The discharge was performed up to 2.5 V at 0.1 C by the CC mode to obtain an initial discharge capacity.

Thereafter, the battery was charged in a 0.2 C constant current/constant potential up to 4.5 V, and was then discharged in a 5 C constant current down to 2.5 V to obtain a discharge capacity in 5 C. The ratio of the discharge capacity in 5 C was calculated when the discharge capacity in 0.1 C was defined as 100%, thereby obtaining a charge and discharge efficiency (%) and rate characteristics (5 C/0.1 C (%)).

The solid electrolyte (sample) obtained in each of Examples 1 to 5, Reference Examples 1 and 2, and Comparative Example 1 was used as a solid electrolyte when producing a positive electrode material pellet to produce a positive electrode layer, and an all-solid battery cell was produced as described above to evaluate the battery characteristics. The results are shown in Table 3.

Here, when the positive electrode layer was produced by using the solid electrolyte (sample) obtained in each of Examples 1 to 5, Reference Examples 1 and 2, and Comparative Example 1, the compound A was used as the solid electrolyte constituting the solid electrolyte layer, and the compound A was used as the solid electrolyte contained in the negative electrode layer.

TABLE 3

| | Compound B Content | Initial battery characteristics | | | Rate characteristics 5 C/0.1 C |
| | | Charge capacity [mAh/g] | Discharge capacity [mAh/g] | Efficiency [%] | Capacity retention rate [%] |
|---|---|---|---|---|---|
| Comparative Example 1 | — | 248.2 | 175.0 | 70.5 | 18.2 |
| Example 1 | 1% by mass | 255.0 | 179.1 | 70.2 | 22.7 |
| Example 2 | 5% by mass | 256.6 | 179.2 | 69.8 | 23.1 |
| Example 3 | 10% by mass | 255.5 | 178.7 | 69.9 | 22.2 |
| Example 4 | 20% by mass | 260.5 | 179.5 | 69.1 | 24.5 |
| Example 5 | 50% by mass | 268.0 | 182.0 | 67.9 | 4.4 |
| Reference Example 1 | 80% by mass | 204.4 | 76.2 | 37.3 | 0.1 |
| Reference Example 2 | 100% by mass | Not charged/discharged | — | — | — |

As shown in Table 3, even when the solid electrolyte obtained in each of Examples 1 to 5 was used for the positive electrode layer, deterioration of the battery characteristics could be suppressed. Specifically, in Examples 1 to 5, the discharge capacities were all 160 mAh/g or more, and good results were obtained. Particularly, in Examples 1 to 4, the capacity retention rates were 20% or more, and good results were obtained.

Next, the solid electrolyte (sample) obtained in each of Examples 1 to 5, Reference Examples 1 and 2, and Comparative Example 1 was used as a solid electrolyte when producing a negative electrode material pellet to produce a negative electrode layer, and an all-solid battery cell was produced as described above to evaluate the battery characteristics. The results are shown in Table 4.

Here, when the negative electrode layer was produced by using the solid electrolyte (sample) obtained in each of Examples 1 to 5, Reference Examples 1 and 2, and Comparative Example 1, the compound A was used as the solid electrolyte constituting the solid electrolyte layer, and the compound A was used as the solid electrolyte contained in the positive electrode layer.

As shown in Table 4, even when the solid electrolyte obtained in each of Examples 1 to 5 and Reference Examples 1 and 2 was used for the negative electrode layer, deterioration of the battery characteristics could be suppressed. Specifically, in Examples 1 to 5 and Reference Examples 1 and 2, good results were obtained in both the initial battery characteristics and the rate characteristics.

The invention claimed is:

1. A sulfide solid electrolyte comprising
a compound, referred to as "component A", having an argyrodite-type structure and containing a lithium (Li) element, a phosphorus (P) element, a sulfur (S) element, and a halogen (X) element, and
a compound, referred to as, "component B", composed of a lithium (Li) element, a chlorine (Cl) element, and a bromine (Br) element and having a peak at each position of 2θ=29.1°±0.5° and 33.7°±0.5° in an X-ray diffraction pattern measured by an X-ray diffraction apparatus (XRD) using CuKα1 rays,
wherein, when an intensity of a peak located at 2θ=30.2°±0.5° is defined as IA and an intensity of a peak located at 2θ=29.1°±0.5° is defined as IB, in an X-ray diffraction pattern measured by the X-ray diffraction apparatus (XRD) using CuKα1 rays, a ratio, IA/IB of IA to IB satisfies 0<IA/IB≤3.5.

2. The sulfide solid electrolyte according to claim 1, wherein the component B has a peak at each position of

TABLE 4

| | Compound B Content | Initial battery characteristics | | | Rate characteristics 5 C/0.1 C |
| | | Charge capacty [mAh/g] | Discharge capacity [mAh/g] | Efficiency [%] | Capacity retention rate [%] |
|---|---|---|---|---|---|
| Comparative Example 1 | — | 191.0 | 134.8 | 70.6 | 41.4 |
| Example 1 | 1% by mass | 204.8 | 145.6 | 71.1 | 43.0 |
| Example 2 | 5% by mass | 202.0 | 143.2 | 70.9 | 42.9 |
| Example 3 | 10% by mass | 204.4 | 144.9 | 70.9 | 40.9 |
| Example 4 | 20% by mass | 206.9 | 146.4 | 70.8 | 43.2 |
| Example 5 | 50% by mass | 206.0 | 146.1 | 70.9 | 41.9 |
| Reference Example 1 | 80% by mass | 209.9 | 149.3 | 71.2 | 46.6 |
| Reference Example 2 | 100% by mass | 190.3 | 139.0 | 73.1 | 39.8 |

2θ=49.0°±0.5°, 58.0°±0.5°, and 60.0°±0.5° in an X-ray diffraction pattern measured by the X-ray diffraction apparatus (XRD) using CuKα1 rays.

3. The sulfide solid electrolyte according to claim 1, wherein, when a particle diameter of the compound A is defined as $D_{50A}$ and a particle diameter of the compound B is defined as $D_{50B}$, and $D_{50A}$ and $D_{50B}$ satisfy $1<(D_{50A}+D_{50B})/D_{50A}$.

4. The sulfide solid electrolyte according to claim 1, wherein the content of the compound B in the sulfide solid electrolyte is 1% by mass or more and 50% by mass or less.

5. The sulfide solid electrolyte according to claim 1, wherein a ratio, (Cl+Br)/P, of a total content in mols of a chlorine (Cl) element and a bromine (Br) element to the content in mols of a phosphorus (P) element satisfies $1.6<(Cl+Br)/P<20.0$.

6. A battery having a positive electrode layer, a negative electrode layer, and a solid electrolyte layer between the positive electrode layer and the negative electrode layer,
wherein the battery comprises the sulfide solid electrolyte according to claim 1.

7. The sulfide solid electrolyte according to claim 2, wherein, when a particle diameter of the compound A is defined as $D_{50A}$ and a particle diameter of the compound B is defined as $D_{50B}$, and $D_{50A}$ and $D_{50B}$ satisfy $1<(D_{50A}+D_{50B})/D_{50A}$.

8. The sulfide solid electrolyte according to claim 2, wherein the content of the compound B in the sulfide solid electrolyte is 1% by mass or more and 50% by mass or less.

9. The sulfide solid electrolyte according to claim 2, wherein a ratio, (Cl+Br)/P, of a total content in mols of a chlorine (Cl) element and a bromine (Br) element to the content in mols of a phosphorus (P) element satisfies $1.6<(Cl+Br)/P<20.0$.

10. A battery having a positive electrode layer, a negative electrode layer, and a solid electrolyte layer between the positive electrode layer and the negative electrode layer,
wherein the battery comprises the sulfide solid electrolyte according to claim 2.

11. A battery having a positive electrode layer, a negative electrode layer, and a solid electrolyte layer between the positive electrode layer and the negative electrode layer,
wherein the battery comprises the sulfide solid electrolyte according to claim 3.

12. A battery having a positive electrode layer, a negative electrode layer, and a solid electrolyte layer between the positive electrode layer and the negative electrode layer,
wherein the battery comprises the sulfide solid electrolyte according to claim 4.

13. A battery having a positive electrode layer, a negative electrode layer, and a solid electrolyte layer between the positive electrode layer and the negative electrode layer,
wherein the battery comprises the sulfide solid electrolyte according to claim 5.

* * * * *